United States Patent
Saitou et al.

(10) Patent No.: US 6,824,573 B2
(45) Date of Patent: Nov. 30, 2004

(54) FUEL FOR USE IN FUEL CELL

(75) Inventors: Kenichirou Saitou, Kanagawa (JP); Iwao Anzai, Kanagawa (JP); Osamu Sadakane, Kanagawa (JP); Michiro Matsubara, Kanagawa (JP)

(73) Assignee: Nippon Oil Corporation, Tokyo (JP)

( * ) Notice: Subject to any disclaimer, the term of this patent is extended or adjusted under 35 U.S.C. 154(b) by 23 days.

(21) Appl. No.: 10/240,746

(22) PCT Filed: Apr. 10, 2001

(86) PCT No.: PCT/JP01/03093

§ 371 (c)(1),
(2), (4) Date: Oct. 10, 2002

(87) PCT Pub. No.: WO01/77264

PCT Pub. Date: Oct. 18, 2001

(65) Prior Publication Data

US 2003/0056429 A1 Mar. 27, 2003

(30) Foreign Application Priority Data

Apr. 10, 2000 (JP) ........................................ 2000-108462

(51) Int. Cl.⁷ ............................................. C10L 01/18
(52) U.S. Cl. ............................ 44/436; 44/447; 44/451; 585/14
(58) Field of Search .......................... 44/447, 451, 436; 585/14

(56) References Cited

U.S. PATENT DOCUMENTS

| | | | |
|---|---|---|---|
| 4,410,333 A | 10/1983 | Fujimoto | |
| 5,897,970 A | 4/1999 | Isomura et al. | |
| 6,132,479 A | * 10/2000 | Welstand et al. | 44/300 |
| 6,514,298 B2 | * 2/2003 | Haji et al. | 44/420 |
| 2002/0020107 A1 | * 2/2002 | Bailey et al. | 44/447 |

FOREIGN PATENT DOCUMENTS

| | | |
|---|---|---|
| JP | 50-126005 | 10/1975 |
| JP | 63-40702 | 2/1988 |
| JP | 5-70780 | 3/1993 |
| JP | 7-188678 | 7/1995 |
| JP | 07-188678 | * 7/1995 |
| JP | 8-311463 | 11/1996 |
| JP | 09091788 | * 3/1997 |
| JP | 10-236802 | 9/1998 |
| JP | 10-255830 | 9/1998 |
| JP | 11-79703 | 3/1999 |
| JP | 11-311136 | 11/1999 |

* cited by examiner

Primary Examiner—Cephia D. Toomer
(74) Attorney, Agent, or Firm—Oblon, Spivak, McClelland, Maier & Neustadt, P.C.

(57) ABSTRACT

A fuel for a fuel cell system comprising 0.5–40 mass % of oxygenates in terms of an oxygen content based on the whole fuel. The fuel for a fuel cell system has a high power generation quantity per weight, a high power generation quantity per $CO_2$ emission, a low fuel consumption, a small evaporative gas (evapo-emission), small deterioration of a fuel cell system comprising such as a reforming catalyst, an aqueous gas shift reaction catalyst, a carbon monoxide removal catalyst, fuel cell stacks and the like to maintain the initial performances for a long duration, good handling properties in view of storage stability and inflammability and a low preheating heat quantity.

7 Claims, 2 Drawing Sheets

FUEL FOR USE IN FUEL CELL

TECHNICAL FIELD

The present invention relates to a fuel to be used for a fuel cell system.

BACKGROUND ART

Recently, with increasing awareness of the critical situation of future global environments, it has been highly expected to develop an energy supply system harmless to the global environments. Especially urgently required are to reduce $CO_2$ to prevent global warming and reduce harmful emissions such as THC (unreacted hydrocarbons in an exhaust gas), $NO_x$, PM (particulate matter in an exhaust gas: soot, unburned high boiling point and high molecular weight fuel and lubricating oil). Practical examples of such a system are an automotive power system to replace a conventional Otto/Diesel engine and a power generation system to replace thermal power generation.

Hence, a fuel cell, which has high energy efficiency and emits only $H_2O$ and $CO_2$, has been regarded as a most expectative system to response to respond to social requests. In order to achieve such a system, it is necessary to develop not only the hardware but also the optimum fuel.

Conventionally, as a fuel for a fuel cell system, hydrogen, methanol, and hydrocarbons have been candidates.

As a fuel for a fuel cell system, hydrogen is advantageous in a point that it does not require a reformer, however, because of a gas phase at a normal temperature, it has difficulties in storage and loading in a vehicle and special facilities are required for its supply. Further, the risk of inflammation is high and therefore, it has to be handled carefully.

On the other hand, methanol is advantageous in a point that it is relatively easy to reform, however power generation quantity per weight is low and owing to its toxicity, handling has to be careful. Further, it has a corrosive property, special facilities are required for its storage and supply.

Like this, a fuel to sufficiently utilize the performances of a fuel cell system has not yet been developed. Especially, as a fuel for a fuel cell system, the following are required: power generation quantity per weight is high; power generation quantity per $CO_2$ emission is high; a fuel consumption is low in a fuel cell system as a whole; an evaporative gas (evapo-emission) is a little; deterioration of a fuel cell system comprising such as a reforming catalyst, a water gas shift reaction catalyst, a carbon monoxide conversion catalyst, fuel cell stacks and the like is scarce to keep the initial performances for a long duration; a starting time for the system is short; and storage stability and handling easiness are excellent.

Incidentally, in a fuel cell system, it is required to keep a fuel and a reforming catalyst at a proper temperature, the net power generation quantity of the entire fuel cell system is equivalent to the value calculated by subtracting the energy necessary for keeping the temperature (the energy for keeping balance endothermic and exothermic reaction following the preheating energy) from the actual power generation quantity. Consequently, if the temperature for the reforming is lower, the energy for preheating is low and that is therefore advantageous and further the system starting time is advantageously shortened. In addition, it is also necessary that the energy for preheating per fuel weight is low. If the preheating is insufficient, unreacted hydrocarbon (THC) in an exhaust gas increases and it results in not only decrease of the power generation quantity per weight but also possibility of becoming causes of air pollution. To say conversely, when some kind of fuels are reformed by the same reformer and the same temperature, it is more advantageous that THC in an exhaust gas is lower and the conversion efficiency to hydrogen is higher.

The present invention, taking such situation into consideration, aims to provide a fuel suitable for a fuel cell system satisfying the above-described requirements in good balance.

DISCLOSURE OF THE INVENTION

Inventors of the present invention have extensively investigated to solve the above-described problems and found that a fuel comprising a specific amount of oxygenates (oxygen-containing compounds) is suitable for a fuel cell system.

That is, a fuel for a fuel cell system according to the invention comprises;

(1) 0.5–40 mass % of oxygenates therein in terms of an oxygen content based on the whole fuel.

The fuel comprising the specific amount of the oxygenates is preferable to satisfy the following additional requirements;

(2) the fuel contains 5 vol. % or more of hydrocarbons based on the whole fuel;

(3) a content of hydrocarbon compounds having a carbon number of 4 is 15 vol. % or less, the content of hydrocarbon compounds having a carbon number of 5 is 5 vol. % or more and the content of hydrocarbon compounds having a carbon number of 6 is 10 vol. % or more based on the whole hydrocarbons;

(4) distillation properties are the initial boiling point in distillation of 24° C. or higher and 40° C. or lower, the 10 vol. % distillation temperature of 25° C. or higher and 50° C. or lower, the 90 vol. % distillation temperature of 45° C. or higher and 130° C. or lower, and the final boiling point in distillation of 55° C. or higher and 150° C. or lower;

(5) a sulfur content is 50 ppm by mass or less based on the whole fuel;

(6) saturates are 30 vol. % or more based on the whole hydrocarbons;

(7) olefins are 35 vol. % or less based on the whole hydrocarbons;

(8) aromatics are 50 vol. % or less based on the whole hydrocarbons;

(9) a ratio of paraffins in saturates is 60 vol. % or more;

(10) a ratio of branched paraffins in paraffins is 30 vol. % or more;

(11) heat capacity of the fuel is 2.6 kJ/kg ° C. or less at 15° C. and 1 atm in liquid phase;

(12) heat of vaporization is 400 kJ/kg or less;

(13) Reid vapor pressure (RVP) is 10 kPa or more and less than 100 kPa;

(14) research octane number (RON, the octane number by research method) is 101.0 or less;

(15) oxidation stability is 240 minutes or longer; and

(16) density is 0.78 g/cm$^3$ or less.

BEST MODE FOR CARRYING OUT THE INVENTION

Figure 1:
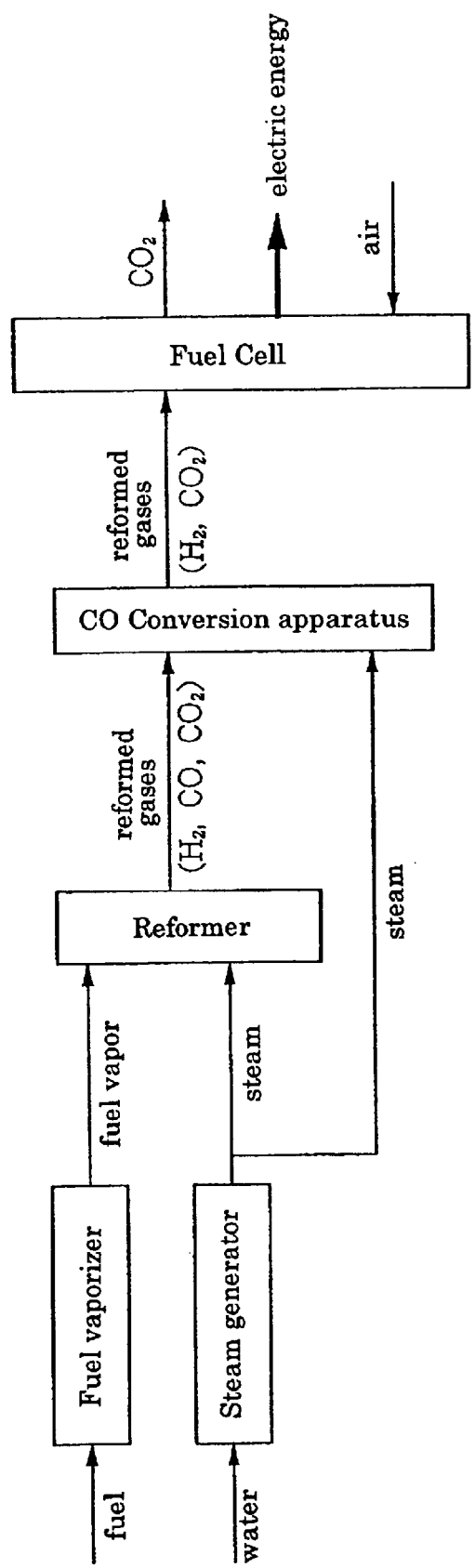
FIG. 1 shows a flow chart of a steam reforming type fuel cell system employed for evaluation of a fuel for a fuel cell system of the invention.

Hereinafter, the contents of the invention will be described further in detail.

In the present invention, the oxygenates mean alcohols having carbon numbers of 2 to 4, ethers having carbon numbers of 2 to 8 and the like. More particularly, the oxygenates include methanol, ethanol, dimethyl ether, methyl tertiary butyl ether (MTBE), ethyl tertiary butyl ether, tertiary amyl methyl ether (TAME), tertiary amyl ethyl ether and the like.

The content of these oxygenates is required to be 0.5 mass % or more in terms of an oxygen content based on the whole fuel in view of a low fuel consumption of a fuel cell system as a whole, a small THC in an exhaust gas, short starting time of a system and the like, and further is required to be 40 mass % or below, preferably 20 mass % or below and most preferably 3 mass % or below taking into consideration of a balance between a power generation quantity per weight and a power generation quantity per CO$_2$ emission.

Although the fuel for a fuel cell system of the invention may contain only oxygenates mentioned-above, the fuel is preferably a mixture of oxygenates and hydrocarbons and it is more preferable that the amount of formulation for hydrocarbons is 5 vol % or more based on the whole fuel in view of a high power generation quantity per weight, a high power generation quantity per CO$_2$ emission and the like.

Although the amount of hydrocarbon compounds having specific carbon numbers contained in hydrocarbons is not restricted when the oxygenates are mixed with the hydrocarbons in the invention, however, the following requirements are preferable.

Although the content of hydrocarbon compounds having a carbon number of 4 is not restricted, the content of hydrocarbon compounds having a carbon number of (V (C$_4$)) shows the content of hydrocarbon compounds having 4 carbon atoms based on the whole hydrocarbons and is required to be 15 vol. % or less since the evaporative gas (evapo-emission) can be suppressed to low and the handling property is good in view of inflammability or the like and preferably 10 vol. % or less and most preferably 5 vol. % or less.

Although the content of hydrocarbon compounds having a carbon number of 5 is not restricted, the content of hydrocarbon compounds having a carbon number of 5 (V (C$_5$)) shows the content of hydrocarbon compounds having 5 carbon atoms based on the whole hydrocarbons and is required to be 5 vol. % or more because of a high power generation quantity per weight, a high power generation quantity per CO$_2$ emission, and a low fuel consumption of a fuel cell system as a whole and preferably 10 vol % or more, more preferably 15 vol. % or more, further more preferably 20 vol. % or more, much further more preferably 25 vol. % or more, and most preferably 30 vol. % or more.

Although the content of hydrocarbon compounds having a carbon number of 6 is not restricted, the content of hydrocarbon compounds having a carbon number of 6 (V (C$_6$)) shows the content of hydrocarbon compounds having 6 carbon atoms based on the whole hydrocarbons and is required to be 10 vol. % or more because of a high power generation quantity and a low fuel consumption of a fuel cell system as a whole and preferably 15 vol. % or more, more preferably 20 vol. % or more, further more preferably 25 vol. % or more, and most preferably 30 vol. % or more.

Although the content of hydrocarbon compounds having carbon numbers of 7 and 8 are not particularly restricted in the invention, hydrocarbon compounds containing 20 vol. % or less as the (V (C$_7$+C$_8$)) in total based on the whole hydrocarbons are preferably used.

Further, in the invention, the content of hydrocarbons having carbon numbers of 10 or more is not particularly restricted, however, because of a high power generation quantity per CO$_2$ emission, a low fuel consumption of a fuel cell system as a whole, and small deterioration of a reforming catalyst to maintain initial performances for a long duration, the total amount of hydrocarbon compounds having carbon numbers of 10 or more (V (C$_{10+}$) based on the whole hydrocarbons is preferably 20 vol. % or less, more preferably 10 vol. % or less and most preferably 5 vol. % or less.

Incidentally, the above-described V (C$_4$), V (C$_5$), V (C$_6$), V (C$_7$+C$_8$), and V (C$_{10+}$) are values quantitatively measured by the following gas chromatography. That is, these values are measured in conditions: employing capillary columns of methyl silicon for columns; using helium or nitrogen as a carrier gas; employing a hydrogen ionization detector (FID) as a detector; the column length of 25 to 50 m; the carrier gas flow rate of 0.5 to 1.5 ml/min, the split ratio of (1:50) to (1:250); the injection inlet temperature of 150 to 250° C.; the initial column temperature of −10 to 10° C.; the final column temperature of 150 to 250° C., and the detector temperature of 150 to 250° C.

Although the distillation properties are not particularly restricted in the fuel of the invention, however, the following properties are preferable. The initial boiling point (initial boiling point 0) is preferably 24° C. or higher and 40° C. or lower, and more preferably 26° C. or higher. The 10 vol. % distillation temperature (T$_{10}$) is preferably 25° C. or higher and 50° C. or lower, and more preferably 30° C. or higher. The 90 vol. % distillation temperature (T$_{90}$) is preferably 45° C. or higher and 130° C. or lower, more preferably 100° C. or lower and furthermore preferably 80° C. or lower. The final boiling point in distillation is preferably 55° C. or higher and 150° C. or lower and more preferably 130° C. or lower and further more preferably 100° C. or lower.

If the initial boiling point (initial boiling point 0) in distillation is low, the fuel is highly inflammable and an evaporative gas (THC) is easy to be generated and there is a problem to handle the fuel. Similarly regarding to the 10 vol. % distillation temperature ($T_{10}$), if it is less than the above-described restricted value, the fuel is highly inflammable and an evaporative gas (THC) is easy to be generated and there is a problem to handle the fuel.

On the other hand, the upper limit values of the 90 vol. % distillation temperature ($T_{90}$) and the final boiling point in distillation are determined in view of a high power generation quantity per weight, a high power generation quantity per $CO_2$ emission, a low fuel consumption of a fuel cell system as a whole, a small THC in an exhaust gas, short starting time of a system, small deterioration of a reforming catalyst to retain the initial properties, and the like.

Further, the 30 vol. % distillation temperature ($T_{30}$), 50 vol. % distillation temperature ($T_{50}$), and 70 vol. % distillation temperature ($T_{70}$) of the fuel of the invention are not particularly restricted, however, the 30 vol. % distillation temperature ($T_{30}$) is preferably 30° C. or higher and 60° C. or lower, the 50 vol. % distillation temperature ($T_{50}$) is preferably 35° C. or higher and 70° C. or lower, and the 70 vol. % distillation temperature ($T_{70}$) is 35° C. or higher and 60° C. or lower.

Incidentally, the above-described initial boiling point (initial boiling point 0) in distillation, the 10 vol. % distillation temperature ($T_{10}$), the 30 vol. % distillation temperature ($T_{30}$), the 50 vol. % distillation temperature ($T_{50}$), the 70 vol. % distillation temperature ($T_{70}$), the 90 vol. % distillation temperature ($T_{90}$), and the final boiling point in distillation are distillation properties measured by JIS K 2254, "Petroleum products-Determination of distillation characteristics".

Further, the content of sulfur in a fuel of the invention is not particularly restricted, however, because deterioration of a fuel cell system comprising such as a reforming catalyst, a water gas shift reaction catalyst, a carbon monoxide removal catalyst, fuel cell stacks, and the like can be suppressed to low and the initial performances can be maintained for a long duration, the content is preferably 50 ppm by mass or less, more preferably 30 ppm by mass or less, further more preferably 10 ppm by mass or less, much further more preferably 1 ppm by mass or less, and most preferably 0.1 ppm by mass or less.

Here, sulfur means sulfur measured by JIS K 2541, "Crude Oil and Petroleum Products-Determination of sulfur content", in case of 1 ppm by mass or more and means sulfur measured by ASTM D4045-96, "Standard Test Method for Sulfur in Petroleum Products by Hydrogenolysis and Rateometric Colorimetry" in the case of less than 1 ppm by mass.

In the invention, the respective contents of saturates, olefins and aromatics are not particularly restricted, however, saturates (V (S)), olefins (V (O)) and aromatics (V (Ar)) are preferably 30 vol. % or more, 35 vol. % or less, and 50 vol. % or less, respectively based on the whole hydrocarbons. Hereinafter, these compounds will separately be described.

In view of a high power generation quantity per weight, a high power generation quantity per $CO_2$ emission, a low fuel consumption of a fuel cell system as a whole, small THC in an exhaust gas, and a short starting time of the system, V (S) is preferably 30 vol. % or more, more preferably 40 vol. % or more, further more preferably 50 vol. % or more, much further more preferably 60 vol. % or more, much further more preferably 70 vol. % or more, much further more preferably 80 vol. % or more, much further more preferably 90 vol. % or more, and most preferably 95 vol. % or more.

In view of a high power generation quantity per weight, a high power generation quantity per $CO_2$ emission, small deterioration of a reforming catalyst to maintain the initial performances for a long duration, and a good storage stability, V (O) is preferably 35 vol. % or less, more preferably 25 vol. % or less, further more preferably 20 vol. % or less, much further more preferably 15 vol. % or less, and most preferably 10 vol. % or less based on the whole hydrocarbons.

In view of a high power generation quantity per weight, a high power generation quantity per $CO_2$ emission, a low fuel consumption of a fuel cell system as a whole, small THC in an exhaust gas, a short starting time of the system, and small deterioration of a reforming catalyst to maintain the initial performances for a long duration, V (Ar) is preferably 50 vol. % or less, more preferably 45 vol. % or less, further more preferably 40 vol. % or less, much further more preferably 35 vol. % or less, much further more preferably 30 vol. % or less, much further more preferably 20 vol. % or less, much further more preferably 10 vol. % or less, and most preferably 5 vol. % or less.

Further, it is most preferable to satisfy the above-described preferable ranges of sulfur and the above-described preferable ranges for the aromatics since deterioration of a reforming catalyst can be suppressed to low and the initial performances can be maintained for a long duration.

The values of the above-described V (S), V (O), and V (Ar) are all measured value according to the fluorescent indicator adsorption method of JIS K 2536, "Liquid petroleum products-Testing method of components".

Further, in the invention, the ratio of paraffins in saturates of a fuel is not particularly restricted, however, because of a high $H_2$ generation quantity, a high power generation quantity per weight, a high power generation quantity per $CO_2$ emission and the like, the ratio of paraffins in saturates is preferably 60 vol. % or more, more preferably 65 vol. % or more, further more preferably 70 vol. % or more, much further more preferably 80 vol. % or more, much further more preferably 85 vol. % or more, much further more preferably 90 vol. % or more, and most preferably 95 vol. % or more.

The above-described saturates and paraffins are values quantitatively measured by the gas chromatography method mentioned above.

Further, the ratio of branched paraffins in the above-described paraffins is not particularly restricted, however, the ratio of branched paraffins in paraffins is preferably 30 vol. % or more, more preferably 50 vol. % or more, and most preferably 70 vol. % or more because of a high power generation quantity per weight, a high power generation quantity per $CO_2$ emission, a low fuel consumption of a fuel cell system as a whole, small THC in an exhaust gas, and a short starting time of the system.

The amounts of the above-described paraffin and branched-type paraffin are values quantitatively measured by the above-described gas chromatography.

Further, in the invention, the heat capacity of a fuel is not particularly restricted, however, the heat capacity is preferably 2.6 kJ/kg·° C. or less at 15° C. and 1 atm in liquid phase in view of a low fuel consumption of a fuel cell system as a whole.

Further, in the invention, the heat of vaporization of a fuel is not particularly restricted, the heat of vaporization is preferably 400 kJ/kg or less in view of a low fuel consumption of a fuel cell system as a whole.

Those heat capacity and heat of vaporization can be calculated from the contents of respective components quantitatively measured by the above-described gas chromatography and the numeric values per unit weight of the respective components disclosed in "Technical Data Book-Petroleum Refining", Vol. 1, Chap. 1, General Data, Table 1C1.

Further, in the invention, the Reid vapor pressure (RVP) of a fuel is not particularly restricted, however, it is preferably 10 kPa or more in relation to the power generation quantity per weight and preferably less than 100 kPa in relation to suppression of the amount of an evaporative gas (evapo-emission). It is more preferably 40 kPa or more and less than 100 kPa and further more preferably 60 kPa or more and less than 100 kPa. Here, the Reid vapor pressure (RVP) means the vapor pressure (Reid vapor pressure (RVP)) measured by JIS K 2258, "Testing Method for Vapor Pressure of Crude Oil and Products (Reid Method)".

Further, in the invention, the research octane number (RON, the octane number by research method) is not particularly restricted, however, it is preferably 101.0 or less since deterioration of a reforming catalyst can be suppressed to low and the initial performances of a reforming catalyst can be maintained for a long duration owing to a high power generation quantity per weight, a low fuel consumption of a fuel cell system as a whole, small THC in an exhaust gas, and a short starting time of the system. Here, the octane number by research method (RON) means the research method octane number measured by JIS K 2280, "Petroleum products-Fuels-Determination of octane number, cetane number and calculation of cetane number index".

Further, in the invention, the oxidation stability of a fuel is not particularly restricted, however, it is preferably 240 minutes or longer in view of storage stability. Here, the oxidation stability is the oxidation stability measured according to JIS K 2287, "Testing Method for Oxidation Stability of Gasoline (Induction Period Method)".

Further, in the invention, the density of a fuel is not particularly restricted, however, it is preferably 0.78 g/cm$^3$ or less since deterioration of a reforming catalyst can be suppressed to low and the initial performances of a reforming catalyst can be maintained for a long duration owing to small THC in an exhaust gas and a short starting time of the system. Here, the density means the density measured according to JIS K 2249, "Crude petroleum and petroleum products-Determination of density and petroleum measurement tables based on a reference temperature (15° C.)".

A production method for the fuel of the invention is not particularly restricted. Practical method is, for example, the fuel can be prepared by blending one or more kinds of oxygenates, and further by blending hydrocarbons at need.

As for hydrocarbons, for example, the hydrocarbons can be produced by using one or more kinds of the following hydrocarbon base materials; light naphtha obtained by the atmospheric distillation of crude oil, heavy naphtha obtained by the atmospheric distillation of crude oil, desulfurized light naphtha obtained by desulfurization of light naphtha, desulfurized heavy naphtha obtained by desulfurization of heavy naphtha, isomerate obtained by converting light naphtha into isoparaffins by an isomerization process, alkylate obtained by the addition reaction (alkylation) of low molecule weight olefins to hydrocarbons such as isobutane, desulfurized alkylate obtained by desulfurizing alkylate, low sulfur alkylate produced from desulfurized hydrocarbons such as isobutane and desulfurized low molecule weight olefins, reformate obtained by catalytic reforming, raffinate which is residue after extraction of aromatics from distillate of reformate, light distillate of reformate, middle to heavy distillate of reformate, heavy distillate of reformate, cracked gasoline obtained by catalytic cracking or hydrocracking process, light distillate of cracked gasoline, heavy diatillate-cracked gasoline, desulfurized cracked gasoline obtained by desulfurizing cracked gasoline, desulfurized light distillate of cracked gasoline obtained by desulfurizing light distillate of cracked gasoline, desulfurized heavy distillate of cracked gasoline obtained by desulfurizing heavy distillate of cracked gasoline, a light distillate of "GTL (Gas to Liquids)" obtained by F-T (Fischer-Tropsch) synthesis after cracking natural gas or the like to carbon monoxide and hydrogen, desulfurized LPG obtained by desulfurizing LPG, and the like. The hydrocarbons can also be produced by desulfurizing by hydrogenating or adsorption after mixing one or more kinds of the above base materials.

Among them, preferable materials as the base materials for the production of the fuel of the invention are light naphtha, desulfurized light naphtha, isomerate, desulfurized alkylates obtained by desulfurizing alkylates, low sulfur alkylates produced from desulfurized hydrocarbons such as isobutane and desulfurized low molecule weight olefins, desulfurized light distillate of cracked gasoline obtained by desulfurizing a light distillate of cracked gasoline, a light distillate of GTL, desulfurized LPG obtained by desulfurizing LPG, and the like.

A fuel for a fuel cell system of the invention may comprise additives such as dyes for identification, oxidation inhibitors for improvement of oxidation stability, metal deactivators, corrosion inhibitors for corrosion prevention, detergents for keeping cleanness of a fuel system, lubricity improvers for improvement of lubricating property and the like.

However, since a reforming catalyst is to be scarcely deteriorated and the initial performances are to be maintained for a long duration, the amount of dyes is preferably 10 ppm or less and more preferably 5 ppm or less. For the same reasons, the amount of oxidation inhibitors is preferably 300 ppm or less, more preferably 200 ppm or less, further more preferably 100 ppm or less, and most preferably 10 ppm or less. For the same reasons, the amount of metal deactivators is preferably 50 ppm or less, more preferably 30 ppm or less, further more preferably 10 ppm or less, and most preferably 5 ppm or less. Further, similarly since a reforming catalyst is to be scarcely deteriorated and the initial performances are to be maintained for a long duration, the amount of corrosion inhibitors is preferably 50 ppm or less, more preferably 30 ppm or less, further more preferably 10 ppm or less, and most preferably 5 ppm or less. For the same reasons, the amount of detergents is preferably 300 ppm or less, more preferably 200 ppm or less, and most preferably 100 ppm or less. For the same reasons, the amount of lubricity improvers is preferably 300 ppm or less, more preferably 200 ppm or less, and most preferably 100 ppm or less.

A fuel of the invention is to be employed as a fuel for a fuel cell system. A fuel cell system mentioned herein comprises a reformer for a fuel, a carbon monoxide conversion apparatus, fuel cells and the like, however, a fuel of the invention may be suitable for any fuel cell system.

The reformer is an apparatus for obtaining hydrogen, by reforming a fuel. Practical examples of the reformer are:

(1) a steam reforming type reformer for obtaining products of mainly hydrogen by treating a heated and vaporized fuel and steam with a catalyst such as copper, nickel, platinum, ruthenium and the like;

(2) a partial oxidation type reformer for obtaining products of mainly hydrogen by treating a heated and vaporized fuel and air with or without a catalyst such as copper, nickel, platinum, ruthenium and the like; and (3) an auto thermal reforming type reformer for obtaining products of mainly hydrogen by treating a heated and vaporized fuel, steam and air, which carries out the partial oxidation of (2) in the prior stage and carries out the steam type reforming of (1) in the posterior stage while using the generated heat of the partial oxidation reaction with a catalyst such as copper, nickel, platinum, ruthenium and the like.

The carbon monoxide conversion apparatus is an apparatus for removing carbon monoxide which is contained in a gas produced by the above-described reformer and becomes a catalyst poison in a fuel cell and practical examples thereof are:

(1) a water gas shift reactor for obtaining carbon dioxide and hydrogen as products from carbon monoxide and steam by reacting a reformed gas and steam in the presence of a catalyst of such as copper, nickel, platinum, ruthenium and the like; and (2) a preferential oxidation reactor for converting carbon monoxide into carbon dioxide by reacting a reformed gas and compressed air in the presence of a catalyst of such as platinum, ruthenium and the like, and these are used singly or jointly.

As a fuel cell, practical examples are a proton exchange membrane type fuel cell (PEFC), a phosphoric acid type fuel cell (PAFC), a molten carbonate type fuel cell (MCFC), a solid oxide type fell cell (SOFC) and the like.

Further, the above-described fuel cell system can be employed for an electric automobile, a hybrid automobile comprising a conventional engine and electric power, a portable power source, a dispersion type power source, a power source for domestic use, a cogeneration system and the like.

EXAMPLES

The properties of base materials employed for the respective fuels for examples and comparative examples are shown in Table 1.

Also, the properties of the respective fuels employed for examples and comparative examples are shown in Table 2.

TABLE 1

|  |  |  | desulfurized light naphtha *1 | isomerate *2 | MTBE |
|---|---|---|---|---|---|
| sulfur |  |  | 0.1 | 0.3 | 0.1 |
| hydrocarbon ratio | carbon number: $C_4$ | vol. % | 5.4 | 2.4 | — |
|  | carbon number: $C_5$ | vol. % | 42.2 | 43.6 | — |
|  | carbon number: $C_6$ | vol. % | 49.2 | 53.6 | — |
|  | carbon number: $C_7$ | vol. % | 3.1 | 0.3 | — |
|  | carbon number: $C_8$ | vol. % | 0.1 | 0.1 | — |
|  | carbon number: $C_9$ | vol. % | 0.0 | 0.0 | — |
|  | carbon number: $C_{10+}$ | vol. % | 0.0 | 0.0 | — |
| composition | saturates | vol. % | 98.9 | 99.9 | — |
|  | olefins | vol. % | 0.0 | 0.1 | — |
|  | aromatics | vol. % | 1.1 | 0.0 | — |
|  | paraffins in saturates | vol. % | 92.6 | 98.4 | — |
|  | branched paraffins in paraffins | vol. % | 37.2 | 83.5 | — |
| oxygen |  | mass % | 0.0 | 0.0 | 18.2 |
| distillation | initial boiling point | ° C. | 28.0 | 32.0 | 55.0 |
|  | 10% point | ° C. | 40.5 | 40.5 | — |
|  | 30% point | ° C. | 47.5 | 43.5 | — |
|  | 50% point | ° C. | 51.5 | 46.5 | — |
|  | 70% point | ° C. | 57.5 | 51.0 | — |
|  | 90% point | ° C. | 68.5 | 58.5 | — |
|  | final boiling point | ° C. | 78.5 | 70.0 | — |
| heat capacity (liquid) |  | kJ/kg · ° C. | 2.197 | 2.197 | 2.075 |
| heat capacity (gas) |  | kJ/kg · ° C. | 1.569 | 1.582 | 1.477 |
| heat of vaporization |  | kJ/kg | 344.4 | 332.8 | 319.7 |
| RVP |  | kPa | 95.6 | 91.0 | 53.0 |

TABLE 1-continued

|  |  |  |  |  |
|---|---|---|---|---|
| research octane number |  | 71.8 | 81.8 | 118.0 |
| oxidation stability | min. | >1440 | >1440 | — |
| density | g/cm$^3$ | 0.6564 | 0.6475 | 0.7456 |
| net heat of combustion | kJ/kg | 44819 | 44798 | 35171 |

|  |  |  | ethanol | methanol | DME *3 |
|---|---|---|---|---|---|
| sulfur |  |  | 0.1 | 0.1 | 0.1 |
| hydrocarbon ratio | carbon number: C$_4$ | vol. % | — | — | — |
|  | carbon number: C$_5$ | vol. % | — | — | — |
|  | carbon number: C$_6$ | vol. % | — | — | — |
|  | carbon number: C$_7$ | vol. % | — | — | — |
|  | carbon number: C$_8$ | vol. % | — | — | — |
|  | carbon number: C$_9$ | vol. % | — | — | — |
|  | carbon number: C$_{10+}$ | vol. % | — | — | — |
| composition | saturates | vol. % | — | — | — |
|  | olefins | vol. % | — | — | — |
|  | aromatics | vol. % | — | — | — |
|  | paraffins in saturates | vol. % | — | — | — |
|  | branched paraffins in paraffins | vol. % | — | — | — |
| oxygen |  | mass % | 34.8 | 49.9 | 34.8 |
| distillation | initial boiling point | °C. | 78.0 | 64.7 | −25.0 |
|  | 10% point | °C. | — | — | — |
|  | 30% point | °C. | — | — | — |
|  | 50% point | °C. | — | — | — |
|  | 70% point | °C. | — | — | — |
|  | 90% point | °C. | — | — | — |
|  | final boiling point | °C. | — | — | — |
| heat capacity (liquid) |  | kJ/kg · °C. | 2.339 | 2.456 | 2.510 |
| heat capacity (gas) |  | kJ/kg · °C. | 1.381 | 1.343 | 1.389 |
| heat of vaporization |  | kJ/kg | 855.6 | 1096.8 | 467.8 |
| RVP |  | kPa | 15.9 | 30.0 | 843.2 |
| research octane number |  |  | 130.0 | 110.0 | — |
| oxidation stability |  | min. | — | — | — |
| density |  | g/cm$^3$ | 0.7963 | 0.7961 | 0.6709 |
| net heat of combustion |  | kJ/kg | 26824 | 19916 | 28840 |

*1: light fractions obtained by further distilling desulfurized full-range naphtha
*2: gasoline fractions obtained by treating desulfurized light naphtha with an isomerization process
*3: dimethyl ether

TABLE 2

|  |  |  | Ex. 1 | Ex. 2 | Ex. 3 | Ex. 4 |
|---|---|---|---|---|---|---|
| Mixing ratio | desulfurized light naphtha |  | 85% |  |  |  |
|  | isomerate |  |  | 95% |  |  |
|  | methanol |  |  | 5% |  |  |
|  | ethanol |  |  |  |  | 100% |
|  | MTBE |  | 15% |  | 100% |  |
|  | DME |  |  |  |  |  |
| Properties | Sulfur | ppm by mass | 0.1 | 0.3 | 0.1 | 0.1 |
|  | ratio by carbon number |  |  |  |  |  |
|  | carbon number: C$_4$ | vol. % | 5 4 | 2.4 | 0.0 | 0.0 |
|  | carbon number: C$_5$ | vol. % | 42.2 | 43.6 | 0.0 | 0.0 |
|  | carbon number: C$_6$ | vol. % | 49.2 | 53.6 | 0.0 | 0.0 |
|  | carbon number: C$_7$ | vol. % | 3.1 | 0.3 | 0.0 | 0.0 |
|  | carbon number: C$_8$ | vol. % | 0.1 | 0.1 | 0.0 | 0.0 |
|  | carbon number: C$_7$ + C$_8$ | vol. % | 3.2 | 0.4 | 0.0 | 0.0 |
|  | carbon number: C$_9$ | vol. % | 0.0 | 0.0 | 0.0 | 0.0 |
|  | carbon number: C$_{10+}$ | vol. % | 0.0 | 0.0 | 0.0 | 0.0 |
|  | Composition in hydrocarbons |  |  |  |  |  |
|  | saturates | vol. % | 98.9 | 99.9 | 0.0 | 0.0 |
|  | olefins | vol. % | 0.0 | 0.1 | 0.0 | 0.0 |
|  | aromatics | vol. % | 1.1 | 0.0 | 0.0 | 0.0 |
|  | paraffins in saturates | vol. % | 92.6 | 98.4 | 0.0 | 0.0 |
|  | branched paraffins in paraffins | vol. % | 37.2 | 83.5 | 0.0 | 0.0 |

TABLE 2-continued

|  |  |  |  |  |  |  |
|---|---|---|---|---|---|---|
| oxygen | mass % | 3.0 | 3.0 | 18.2 | 34.8 |
| Density | g/cm³ | 0.6698 | 0.6549 | 0.7456 | 0.7963 |
| Distillation properties |  |  |  |  |  |
| initial boiling point | ° C. | 28.0 | 32.0 | 55.0 | 78.0 |
| 10% point | ° C. | 40.5 | 40.5 | — | — |
| 30% point | ° C. | 49.5 | 43.5 | — | — |
| 50% point | ° C. | 53.5 | 45.5 | — | — |
| 70% point | ° C. | 55.5 | 50.5 | — | — |
| 90% point | ° C. | 67.0 | 59.5 | — | — |
| final boiling point | ° C. | 84.5 | 79.0 | — | — |
| Reid vapor pressure | kPa | 81 | 106 | — | — |
| Research octane number |  | 79.8 | 85.8 | — | — |
| Oxidation stability | min. | 1440 or more | 1440 or more | — | — |
| net heat of combustion | kJ/kg | 43210 | 43290 | 35171 | 26824 |
| Heat capacity (liquid) | kJ/kg · ° C. | 2.176 | 2.212 | 2.075 | 2.339 |
| Heat capacity (gas) | kJ/kg · ° C. | 1.554 | 1.567 | 1.477 | 1.381 |
| Heat of vaporization | kJ/kg | 340.2 | 379.3 | 319.7 | 755.6 |

|  |  |  | Ex. 5 | Comp. Ex. 1 | Comp. Ex. 2 |
|---|---|---|---|---|---|
| Mixing ratio | desulfurized light naphtha |  |  | 100% |  |
|  | isomerate |  |  |  |  |
|  | methanol |  |  |  | 100% |
|  | ethanol |  |  |  |  |
|  | MTBE |  |  |  |  |
|  | DME |  | 100% |  |  |
| Properties | Sulfur | ppm by mass | 0.1 | 0.1 | 0.1 |
|  | ratio by carbon number |  |  |  |  |
|  | carbon number: C₄ | vol. % | 0.0 | 54 | 0.0 |
|  | carbon number: C₅ | vol. % | 0.0 | 42.2 | 0.0 |
|  | carbon number: C₆ | vol. % | 0.0 | 49.2 | 0.0 |
|  | carbon number: C₇ | vol. % | 0.0 | 3.1 | 0.0 |
|  | carbon number: C₈ | vol. % | 0.0 | 0.1 | 0.0 |
|  | carbon number: C₇ + C₈ | vol. % | 0.0 | 3.2 | 0.0 |
|  | carbon number: C₉ | vol. % | 0.0 | 0.0 | 0.0 |
|  | carbon number: C₁₀₊ | vol. % | 0.0 | 0.0 | 0.0 |
|  | Composition in hydrocarbons |  |  |  |  |
|  | saturates | vol. % | 0.0 | 98.9 | 0.0 |
|  | olefins | vol. % | 0.0 | 0.0 | 0.0 |
|  | aromatics | vol. % | 0.0 | 1.1 | 0.0 |
|  | paraffins in saturates | vol. % | 0.0 | 92.6 | 0.0 |
|  | branched paraffins in paraffins | vol. % | 0.0 | 37.2 | 0.0 |
|  | oxygen | mass % | 34.8 | 0.0 | 49.9 |
|  | Density | g/cm³ | 0.6709 | 0.6564 | 0.7961 |
|  | Distillation properties |  |  |  |  |
|  | initial boiling point | ° C. | −25.0 | 28.0 | 65.0 |
|  | 10% point | ° C. | — | 40.5 | — |
|  | 30% point | ° C. | — | 47.5 | — |
|  | 50% point | ° C. | — | 51.5 | — |
|  | 70% point | ° C. | — | 57.5 | — |
|  | 90% point | ° C. | — | 68.5 | — |
|  | final boiling point | ° C. | — | 88.5 | — |
|  | Reid vapor pressure | kPa | — | 89 | — |
|  | Research octane number |  | — | 71.8 | — |
|  | Oxidation stability | min. | — | 1350 | — |
|  | net heat of combustion | kJ/kg | 28840 | 44820 | 19916 |
|  | Heat capacity (liquid) | kJ/kg · ° C. | 2.510 | 2.197 | 2.456 |
|  | Heat capacity (gas) | kJ/kg · ° C. | 1.389 | 1.569 | 1.343 |
|  | Heat of vaporization | kJ/kg | 467.8 | 344.4 | 1096.8 |

These respective fuels were subjected to a fuel cell system evaluation test, an evaporative gas test, and a storage stability test.

Fuel Cell System Evaluation Test (1) Steam Reforming

A fuel and water were evaporated by electric heating and led to a reformer filled with a noble metal type catalyst and kept at a prescribed temperature by an electric heater to generate a reformed gas enriched with hydrogen.

The temperature of the reformer was adjusted to be the minimum temperature (the minimum temperature at which no THC was contained in a reformed gas) at which reforming was completely carried out in an initial stage of the test.

Together with steam, a reformed gas was led to a carbon monoxide conversion apparatus (a water gas shift reaction) to convert carbon monoxide in the reformed gas to carbon dioxide and then the produced gas was led to a solid polymer type fuel cell to carry out power generation.

A flow chart of a steam reforming type fuel cell system employed for the evaluation was illustrated in FIG. 1.

(2) Partial Oxidation

A fuel is evaporated by electric heating and together with air, the evaporated fuel was led to a reformer filled with a noble metal type catalyst and kept at a 1100° C. by an electric heater to generate a reformed gas enriched with hydrogen.

Together with steam, a reformed gas was led to a carbon monoxide conversion apparatus (a water gas shift reaction) to convert carbon monoxide in the reformed gas to carbon dioxide and then the produced gas was led to a solid polymer type fuel cell to carry out power generation.

Figure 2:
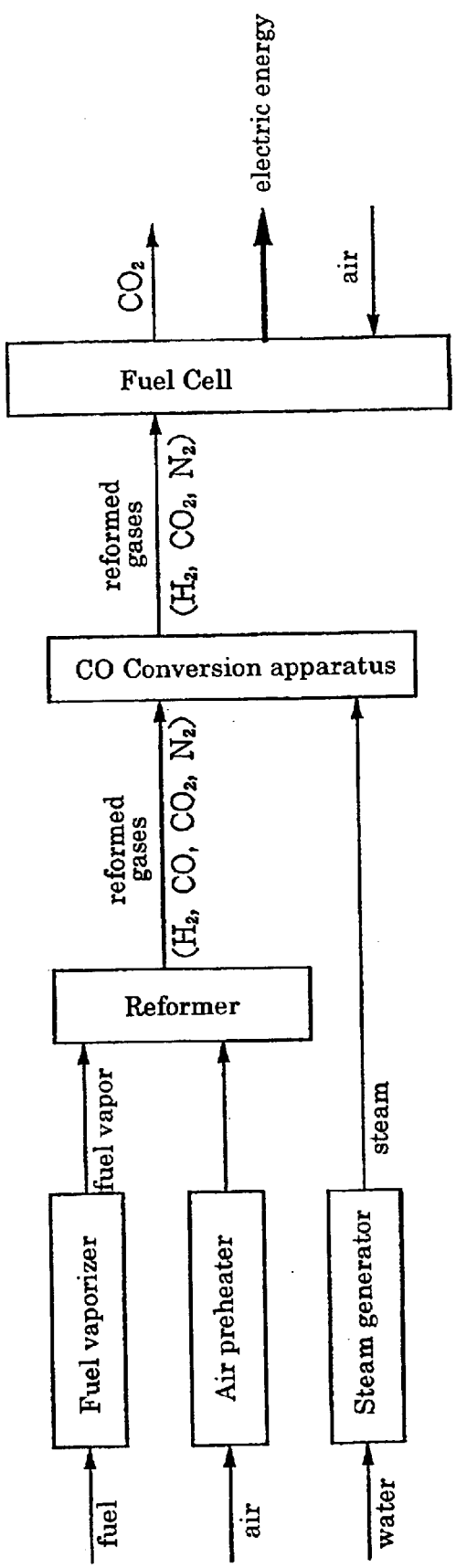
FIG. 2 is a flow chart of a partial oxidation type fuel cell system employed for evaluation of a fuel for a fuel cell system of the invention.

A flow chart of a partial oxidation type fuel cell system employed for the evaluation was illustrated in FIG. 2.

(3) Evaluation Method

The amounts of $H_2$, CO, $CO_2$ and THC in the reformed gas generated from a reformer were measured immediately after starting of the evaluation test. Similarly, the amounts of $H_2$, CO, $CO_2$ and THC in the reformed gas generated from a carbon monoxide conversion apparatus were measured immediately after starting of the evaluation test.

The power generation quantity, the fuel consumption, and the $CO_2$ amount emitted out of a fuel cell were measured immediately after starting of the evaluation test and 100 hours later from the starting.

The energy (preheating quantities) necessary to heat the respective fuels to a prescribed reforming temperature were calculated from the heat capacities and the heat of vaporization.

Further, these measured values, calculated values and the heating values of respective fuels were employed for calculation of the performance deterioration ratio of a reforming catalyst (the power generation amount after 100 hours later from the starting divided by the power generation amount immediately after the starting), the thermal efficiency (the power generation amount immediately after the starting divided by the net heat of combustion of a fuel), and the preheating energy ratio (preheating energy divided by the power generation amount).

Evaporative Gas Test

A hose for filling a sample was attached to a fuel supply port of a 20 liter portable gasoline can and the installation part was completely sealed. While an air venting valve of the can being opened, 5 liter of each fuel was loaded. On completion of the loading, the air venting valve was closed and the can was left still for 30 minutes. After the can being kept still, an activated carbon adsorption apparatus was attached to the air venting valve and the valve was opened. Immediately, 10 liter of each fuel was supplied from the fuel supply port. After 5 minutes of the fuel supply, while the air releasing valve being opened and kept as it was, the vapor was absorbed in the activated carbon and after that, the weight increase of the activated carbon was measured. Incidentally, the test was carried out at a constant temperature of 25° C.

Storage Stability Test

A pressure resistant closed container was filled with each fuel and oxygen, heated to 100° C. and while the temperature being kept as it was, the container was kept still for 24 hours. Evaluation was carried out according to "Petroleum products—Motor gasoline and aviation fuels—Determination of existent gum" defined as JIS K 2261.

The respective measured values and the calculated values are shown in Table 3.

TABLE 3

| | | | EX. 1 | EX. 2 | EX. 3 | EX. 4 |
|---|---|---|---|---|---|---|
| Evaluation results | | | | | | |
| Electric power generation by steam reforming method (reforming temperature = optimum reforming temperature 1)) | | | | | | |
| Optimum reforming temperature | ° C. | | 620 | 610 | 440 | 405 |
| Electric energy | kJ/fuel kg | initial performance | 29370 | 29530 | 24920 | 20860 |
| | | 100 hours later | 29350 | 29500 | 24900 | 20850 |
| | performance deterioration ratio | 100 hours later | 0.07% | 0.10% | 0.08% | 0.05% |
| Thermal efficiency 2) | | initial performance | 68% | 68% | 71% | 78% |
| $CO_2$ generation | kg/fuel kg | initial performance | 2.970 | 2.956 | 2.496 | 1.911 |
| Energy per $CO_2$ | KJ/$CO_2$-kg | initial performance | 9889 | 9990 | 9984 | 10916 |
| Preheating energy 3) | kJ/fuel kg | | 1281 | 1309 | 950 | 1431 |
| Preheating energy ratio 4) | | | 4.4% | 4.4% | 3.8% | 6.9% |
| Electric power generation by partial oxidation reforming method (reforming temperature 1100° C.) | | | | | | |
| Electric energy | kJ/fuel kg | initial performance | 14550 | 14770 | 12460 | 11320 |
| | | 100 hours later | 14540 | 14750 | 12450 | 11310 |
| | performance deterioration ratio | 100 hours later | 0.07% | 0.14% | 0.08% | 0.09% |
| Thermal efficiency 2) | | initial performance | 34% | 34% | 35% | 42% |
| $CO_2$ generation | kg/fuel kg | initial performance | 2.972 | 2.958 | 2.498 | 1.912 |
| Energy per $CO_2$ | KJ/$CO_2$-kg | initial performance | 4896 | 4993 | 4988 | 5921 |

TABLE 3-continued

|  |  |  |  |  |  |
|---|---|---|---|---|---|
| Preheating energy 3) | kJ/fuel kg |  | 2026 | 2077 | 1925 | 2391 |
| Preheating energy ratio 4) |  |  | 13.9% | 14.1% | 15.4% | 21.1% |
| Evaporative gas test |  |  |  |  |  |  |
| Evaporative gas Storage stability test | g/test |  | 18.1 | 28.9 | 5.9 | — |
| Washed existent gum | mg/100 ml |  | 1 | 1 | 1 | — |

|  |  |  | EX. 5 | Comp. Ex. 1 | Comp. Ex. 2 |
|---|---|---|---|---|---|
| Evaluation results |  |  |  |  |  |
| Electric power generation by steam reforming method (reforming temperature = optimum reforming temperature 1)) |  |  |  |  |  |
| Optimum reforming temperature | ° C. |  | 320 | 680 | 300 |
| Electric energy | kJ/fuel kg | initial performance | 20850 | 30260 | 17140 |
|  |  | 100 hours later | 20840 | 30240 | 17130 |
|  | performance deterioration ratio | 100 hours later | 0.05% | 0.07% | 0.06% |
| Thermal efficiency 2) |  | initial performance | 72% | 68% | 86% |
| $CO_2$ generation | kg/fuel kg | initial performance | 1.912 | 3.064 | 1.374 |
| Energy per $CO_2$ | KJ/$CO_2$-kg | initial performance | 10905 | 9876 | 12475 |
| Preheating energy 3) | kJ/fuel kg |  | 410 | 1391 | 1484 |
| Preheating energy ratio 4) |  |  | 2.0% | 4.6% | 8.7% |
| Electric power generation by partial oxidation reforming method (reforming temperature 1100° C.) |  |  |  |  |  |
| Electric energy | kJ/fuel kg | initial performance | 11330 | 14970 | 10280 |
|  |  | 100 hours later | 11320 | 14950 | 10270 |
|  | performance deterioration ratio | 100 hours later | 0.09% | 0.13% | 0.10% |
| Thermal efficiency 2) |  | initial performance | 39% | 33% | 52% |
| $CO_2$ generation | kg/fuel kg | initial performance | 1.910 | 3.065 | 1.374 |
| Energy per $CO_2$ | KJ/$CO_2$-kg | initial performance | 5932 | 4884 | 7482 |
| Preheating energy 3) | kJ/fuel kg |  | 1493 | 2047 | 2585 |
| Preheating energy ratio 4) |  |  | 13.2% | 13.7% | 25.1% |
| Evaporative gas test |  |  |  |  |  |
| Evaporative gas Storage stability test | g/test |  | — | 21.5 | — |
| Washed existent gum | mg/100 ml |  | — | 2 | — |

1) the minimum temperature at which no THC is contained in a reformed gas
2) electric energy/net heat of combustion of fuel
3) energy necessary for heating a fuel to a reforming temperature
4) preheating energy/electric energy

INDUSTRIAL APPLICABILITY

As described above, a fuel for a fuel cell system of the invention comprising a specific amount of oxygenates has performances with small deterioration and can provide high output of electric energy and other than that, the fuel can satisfy a variety of performances for a fuel cell system.

What is claimed is:

1. A fuel for a fuel cell system comprising 0.5–40 mass % of oxygenates in terms of an oxygen content based on the whole fuel, wherein the fuel contains 5 vol. % or more of hydrocarbons based on the whole fuel, a content of hydrocarbon compounds having 4 carbon atoms is 15 vol. % or less, a content of hydrocarbon compounds having 5 carbon atoms is 5 vol. % or more and a content of hydrocarbon compounds having 6 carbon atoms is 10 vol. % or more based on the whole hydrocarbons, a sulfur content is 1 ppm by mass or less based on the whole fuel, saturates are 30 vol. % or more based on the whole hydrocarbons, a ratio of branched paraffins in paraffins is 30 vol. % or more, heat capacity of the fuel is 2.6 kJ/kg ° C. or less at 15° C. and 1 atm in liquid phase, heat of vaporization of the fuel is 400 kJ/kg or less, said fuel has distillation properties of an initial boiling point in distillation of 24° C. or higher and 40° C. or lower, a 10 vol. % distillation temperature ($T_{10}$) of 25° C. or higher and 50° C. or lower, a 90 vol. % distillation temperature ($T_{90}$) of 45° C. or higher and 100° C. or lower, and a final boiling point in distillation of 55° C. or higher and 130° C. or lower.

2. A fuel for a fuel cell system according to claim 1, wherein olefins are 35 vol. % or less based on the whole hydrocarbons.

3. A fuel for a fuel cell system according to claim 1, wherein aromatics are 50 vol. % or less based on the whole hydrocarbons.

4. A fuel for a fuel cell system according to claim 1, wherein Reid vapor pressure of the fuel is 10 kPa or more and less than 100 kPa.

5. A fuel for a fuel cell system according to claim 1, wherein research octane number of the fuel is 101.0 or less.

6. A fuel for a fuel cell system according to claim 1, wherein oxidation stability of the fuel is 240 minutes or longer.

7. A fuel for a fuel cell system according to claim 1, wherein density of the fuel is 0.78 $g/cm^3$ or less.

* * * * *